United States Patent
Eckel et al.

(10) Patent No.: US 9,496,782 B2
(45) Date of Patent: Nov. 15, 2016

(54) DIGITALLY-CONTROLLED POWER FACTOR CORRECTION CIRCUITS, METHODS AND ARTICLES OF MANUFACTURE

(75) Inventors: David P. Eckel, Fort Salonga, NY (US); Eric Johannessen, Bohemia, NY (US); Andrew B. Walsh, East Islip, NY (US); Luis Sam, South Setauket, NY (US); Seckin K. Secilmis, Seaford, NY (US)

(73) Assignee: B/E AEROSPACE, INC., Wellington, FL (US)

( * ) Notice: Subject to any disclaimer, the term of this patent is extended or adjusted under 35 U.S.C. 154(b) by 98 days.

(21) Appl. No.: 13/335,544

(22) Filed: Dec. 22, 2011

(65) Prior Publication Data

US 2013/0162224 A1    Jun. 27, 2013

(51) Int. Cl.
*H02M 1/42*    (2007.01)
*H05B 33/08*    (2006.01)

(52) U.S. Cl.
CPC ............ *H02M 1/42* (2013.01); *H05B 33/0815* (2013.01); *Y02B 20/346* (2013.01)

(58) Field of Classification Search
CPC .......... G05F 1/70; G05F 1/575; H02M 7/04; H02M 3/335
USPC .............. 323/222–229, 282–287; 363/21.12, 363/21.14, 21.16–21.18, 41, 84–89
See application file for complete search history.

(56) References Cited

U.S. PATENT DOCUMENTS

| | | | | |
|---|---|---|---|---|
| 4,051,425 A * | 9/1977 | Smith | ................... | H02M 1/092 323/237 |
| 5,050,057 A * | 9/1991 | Notohara | ............ | H02M 1/4208 363/124 |
| 6,034,513 A * | 3/2000 | Farrington | .......... | H02M 1/4225 323/222 |
| 6,388,429 B1 * | 5/2002 | Mao | ......................... | G05F 1/70 323/222 |
| 7,198,387 B1 | 4/2007 | Gloisten et al. | | |
| 7,719,248 B1 * | 5/2010 | Melanson | ...................... | 323/283 |
| 7,821,237 B2 * | 10/2010 | Melanson | ..................... | 323/222 |
| 7,919,950 B2 * | 4/2011 | Uno | .................... | H02M 1/4225 323/207 |

(Continued)

OTHER PUBLICATIONS

Mildbrandt, "The Digital Imperative: The Rising Wave in Power Factor Correction (PFC) Techniques", 2009, pp. 1-5, Cirrus Logic, Inc., Austin, TX.

(Continued)

*Primary Examiner* — Timothy J Dole
*Assistant Examiner* — Yusef Ahmed
(74) *Attorney, Agent, or Firm* — Drinker Biddle & Reath LLP

(57) ABSTRACT

A disclosed power supply includes a power factor correction circuit including a switch, an inductor having a first terminal connected to an input voltage, and a second terminal connected to the switch, a storage capacitor and a load, a value of the inductor selected to operate the power factor correction circuit in discontinuous conduction mode, and a controller programmed to operate the switch to increase a power factor of the power supply. The switching frequency of the switch is periodically adjusted to reduce electromagnetic interference.

15 Claims, 4 Drawing Sheets

(56) References Cited

U.S. PATENT DOCUMENTS

| | | | |
|---|---|---|---|
| 8,025,423 B2 | 9/2011 | Hancock et al. | |
| 8,125,805 B1* | 2/2012 | Melanson | 363/89 |
| 8,368,361 B2* | 2/2013 | Melanson | H02M 3/156 323/224 |
| 2006/0187081 A1 | 8/2006 | Gloisten et al. | |
| 2007/0058402 A1* | 3/2007 | Shekhawat | H02M 1/42 363/89 |
| 2008/0094047 A1* | 4/2008 | Huynh | H02M 3/33523 323/282 |
| 2008/0130321 A1* | 6/2008 | Artusi | H02M 1/4225 363/21.01 |
| 2008/0136395 A1* | 6/2008 | Bennett | H02M 3/156 323/288 |
| 2008/0272744 A1* | 11/2008 | Melanson | H02M 1/4225 323/205 |
| 2008/0272745 A1 | 11/2008 | Melanson | |
| 2008/0272746 A1 | 11/2008 | Melanson | |
| 2008/0272747 A1 | 11/2008 | Melanson | |
| 2008/0272748 A1* | 11/2008 | Melanson | H02M 1/4225 323/207 |
| 2008/0272758 A1* | 11/2008 | Melanson | H02M 1/4225 323/283 |
| 2008/0284397 A1* | 11/2008 | Chang | H02M 3/157 323/283 |
| 2008/0284401 A1* | 11/2008 | Oettinger | H02M 3/157 323/283 |
| 2008/0310201 A1* | 12/2008 | Maksimovic | H02M 3/1584 363/85 |
| 2008/0316779 A1* | 12/2008 | Jayaraman | H02M 1/4225 363/74 |
| 2010/0072904 A1 | 3/2010 | Eckel et al. | |
| 2010/0110706 A1 | 5/2010 | Eckel et al. | |
| 2010/0128472 A1 | 5/2010 | Hancock et al. | |
| 2010/0165667 A1* | 7/2010 | Artusi | H02M 1/4225 363/21.01 |
| 2010/0253305 A1* | 10/2010 | Melanson | H02M 1/4225 323/282 |
| 2010/0308733 A1* | 12/2010 | Shao | H02M 1/4225 315/119 |
| 2011/0110126 A1* | 5/2011 | Morrish | H02M 1/44 363/21.18 |
| 2011/0211377 A1* | 9/2011 | Uno | H02M 1/4225 363/124 |
| 2011/0216558 A1* | 9/2011 | Uno | H02M 1/4225 363/21.12 |
| 2011/0248696 A1* | 10/2011 | Tichy | H02M 3/1588 323/288 |
| 2011/0267856 A1* | 11/2011 | Pansier | H02M 1/4225 363/84 |
| 2012/0014148 A1* | 1/2012 | Li | H02M 1/4216 363/78 |
| 2012/0057382 A1* | 3/2012 | Uno | H02M 1/4225 363/89 |
| 2012/0134187 A1* | 5/2012 | Sutardja | G05F 1/70 363/89 |
| 2012/0153858 A1* | 6/2012 | Melanson | H02M 3/33523 315/279 |
| 2012/0194143 A1* | 8/2012 | Melanson | H02M 1/4225 323/209 |
| 2012/0195073 A1* | 8/2012 | Yamane | H02M 1/32 363/13 |
| 2012/0235649 A1* | 9/2012 | Uno | H02M 1/4225 323/210 |
| 2012/0299564 A1* | 11/2012 | Howes | G05F 1/575 323/281 |
| 2014/0062434 A1* | 3/2014 | Ouyang | H02M 3/156 323/271 |
| 2014/0097808 A1* | 4/2014 | Clark | G05F 1/70 323/208 |
| 2014/0192563 A1* | 7/2014 | Lin | H02M 3/33523 363/21.13 |

OTHER PUBLICATIONS

Biven, "The Rising Wave in Digital Power Factor Correction (PFC) Targets Lighting Ballasts", 2011, pp. 1-2, Cirrus Logic, Inc., Austin, TX.

CS1500 Digital Power Factor Correction IC, Advance Product Information DS849A6, May 2010, pp. 1-22, Cirrus Logic, Inc., Austin, TX.

CS1501 Digital Power Factor Correction Control IC, Preliminary Product Information DS927PP6, Jun. 2011, pp. 1-16, Cirrus Logic, Inc., Austin, TX.

CS1601, CS1601H Digital PFC Controller for Electronic Ballasts, DS931F1, Sep. 2011, pp. 1-16, Cirrus Logic, Inc., Austin, TX.

ADP1047 300 Watt Evaluation Kit, ADP1047-300-EVALZ, PRD 1334, Rev. 1.3, 2009, pp. 1-28, Analog Devices, Inc., Norwood, MA.

Digital Power Factor Correction Controller With Accurate AC Power Metering, Preliminary Technical Data ADP1047, Rev. PrA, 2011, pp. 1-12, Analog Devices, Inc., Norwood, MA.

"Analog Devices Demonstrates Industry's First Digital Power Factor Correction Controller With Power Metering at APEC 2011", Press Release, Mar. 7, 2011, 2 pages, Howard Wisniowski, ed., Analog Devices, Inc., Norwood, MA.

\* cited by examiner

DIGITALLY-CONTROLLED POWER FACTOR CORRECTION CIRCUITS, METHODS AND ARTICLES OF MANUFACTURE

FIELD OF THE DISCLOSURE

This disclosure relates generally to power factor correction, and, more particularly, to digitally-controlled power factor correction circuits, methods, and articles of manufacture.

BACKGROUND

A load with a low power factor draws more current than a load with a high power factor for the same amount of useful power transferred. To improve efficiency, a power factor correction (PFC) circuit dynamically adjusts the current drawn from an alternating current (AC) power source so the current substantially follows the voltage of the power source. For example, more current is drawn when the voltage of the power source is higher. In general, a PFC circuit actively pulses incoming current in accordance with the shape of the incoming voltage, and provides a substantially constant current output. A PFC circuit is often used in conjunction with switching power supplies.

BRIEF DESCRIPTION OF THE DRAWINGS

Features and advantages of this disclosure will become apparent in review of exemplary embodiments with reference to the attached drawings in which.

DETAILED DESCRIPTION

Conventional PFC circuits use a large group of inductors and capacitors to shift current draw to align with the shape of an input voltage. Conventional PFC circuits typically consume a relatively large amount of circuit board space (e.g., a 4"×2" area). At that size, such conventional PFC circuits are not readily distributed throughout a vehicle passenger compartment such as an aircraft cabin, a train car, a bus, etc. where space is severely constrained.

Digitally-controlled PFC circuits, methods, and articles of manufacture that address at least size constraints are disclosed herein. Disclosed digitally-controlled PFC circuits can be made substantially smaller than conventional PFC circuits. An exemplary PFC circuit consumes around 1"×1" of circuit board area enabling it to be readily combined with other functions (e.g., light-emitting diode (LED) control) and easily used throughout an aircraft cabin, a train car, a bus, etc. For example, a same processor can be used to perform LED control and PFC circuit control. Moreover, the examples disclosed herein can be easily configured to support different switching frequencies (e.g., 60 cycles per second (Hz), 400 Hz, etc.), and may dither the switching frequency to reduce electromagnetic interference (EMI) emission compared to conventional PFC circuits. In some embodiments, components are selected to ensure that the PFC circuit operates in discontinuous conduction mode (DCM), thereby obviating the need for zero crossing detectors and current sense circuits required in conventional PFC circuits. Some embodiments incorporate in-rush current limiting, and hysteresis to ensure stability, reduce overshoot and prevent oscillations. Disclosed embodiments may be used to implement a single-stage flyback power supply that simultaneously performs PFC and voltage conversion.

Exemplary embodiments will now be described more fully with reference to the accompanying drawings.

Figure 1:
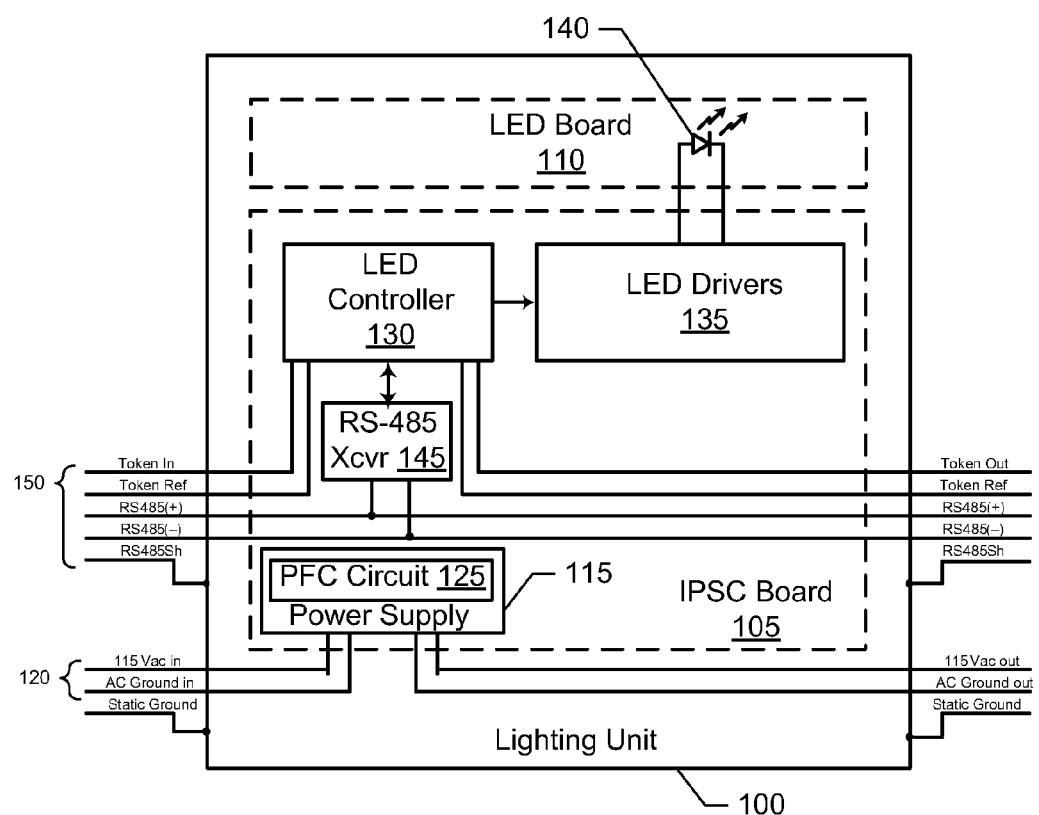
FIG. 1 is a schematic illustration of an example lighting unit having an integrated power supply and control (IPSC) circuit board that includes a digitally-controlled PFC circuit.

FIG. 1 is a schematic illustration of an example lighting unit 100 having an IPSC circuit board 105 and an LED circuit board 110. While the circuit boards 105 and 110 are separate in the example of FIG. 1, they may be implemented using a single circuit board. To provide power for the IPSC circuit board 105, the IPSC circuit board 105 includes a power supply 115. From an AC input 120, the example power supply 115 forms one or more AC or direct current (DC) supply voltages for use by other components of the IPSC circuit board 105. In some examples, the power supply 115 includes a flyback power supply used to provide a voltage source or a current source for driving LEDs of the LED circuit board 110.

To increase the power factor of the power supply 115, the power supply 115 includes a digitally-controlled PFC circuit 125. As described below in connection with FIGS. 2-4, the digitally-controlled PFC circuit 125 includes a programmable processor 235 that digitally controls the operation of the PFC circuit 125 to, for example, limit inrush current, reduce EMI emission, increase stability, reduce voltage overshoots, and reduce oscillations.

To provide lighting, the IPSC board 105 includes an LED controller 130 and LED drivers 135, and the lighting board 110 includes a plurality of LEDs (one of which is designated at reference numeral 140). The LED controller 130 receives lighting and configuration commands via an RS-485 transceiver 145 and an RS-485 bus 150. Example LED controllers 130, LED drivers 135 and lighting boards 110 that may be used to implement the lighting unit 100 are described in U.S. patent application Ser. No. 11/345,260, filed on Jan. 31, 2006, and entitled "Lighting System and Method and Apparatus for Adjusting Same"; and U.S. patent application Ser. No. 12/101,377, filed on Apr. 11, 2008, and entitled "LED Lighting System For Retrofitting An Aircraft Cabin Fluorescent Lighting System." U.S. patent application Ser. No. 11/345,260 and U.S. patent application Ser. No. 12/101,377 are incorporated herein by reference in their entireties.

Because the PFC circuit 125 is substantially smaller than conventional PFC circuits, the power supply 115 can be combined with the LED controller 130 and the LED drivers 135 into a form factor that is previously unachievable. For example, the IPSC board 105 can be designed to be approximately 0.6"×12" and, thus, can be readily implemented within each of a large number of 12" or 25" lighting units used to provide lighting throughout an aircraft cabin. Moreover, integrating the power supply 115, the LED controller 130 and the LED drivers 135 on a same circuit board 100 reduces costs and manufacturing time.

While an example lighting unit 100 is illustrated in FIG. 1, any of the illustrated elements may be combined, divided, re-arranged, omitted, eliminated and/or implemented in any other way. For example, the IPSC board 105 and the LED board 110 may be combined, and/or a same processor may be used to control the PFC circuit 125 and the LED drivers 135. The IPSC board 105 may be implemented by any combination of processors, circuit(s), fuses, application-specific integrated circuits (ASICs), programmable logic devices (PLDs), field-programmable logic devices (FPLDs), field-programmable gate arrays (FPGAs), etc. When any embodiment of this disclosure is interpreted to cover a purely software and/or firmware implementation, at least one of the PFC circuit 125, the LED controller 130 and/or the IPSC board 105 is expressly defined to include a tangible or non-transitory article of manufacture such as a computer-readable storage medium storing machine-readable instructions such as the firmware and/or software. The lighting unit 100 may include elements instead of, or in addition to, those illustrated, and/or may include more than one of any or all of the illustrated elements.

Figure 2:
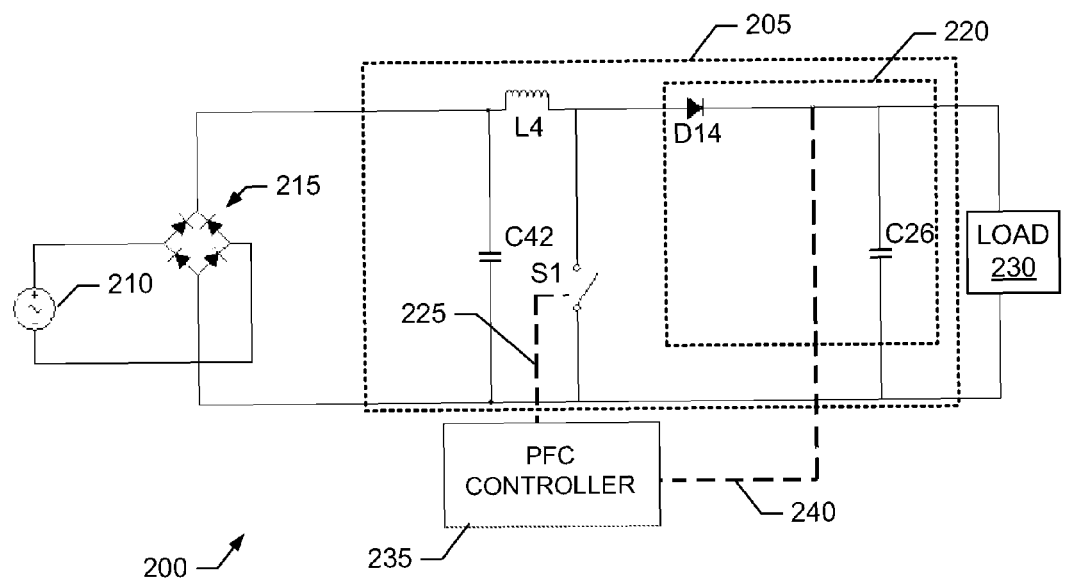
FIGS. 2-4 are schematics of example digitally-controlled PFC circuits constructed in accordance with the teachings of this disclosure.
Figure 3:
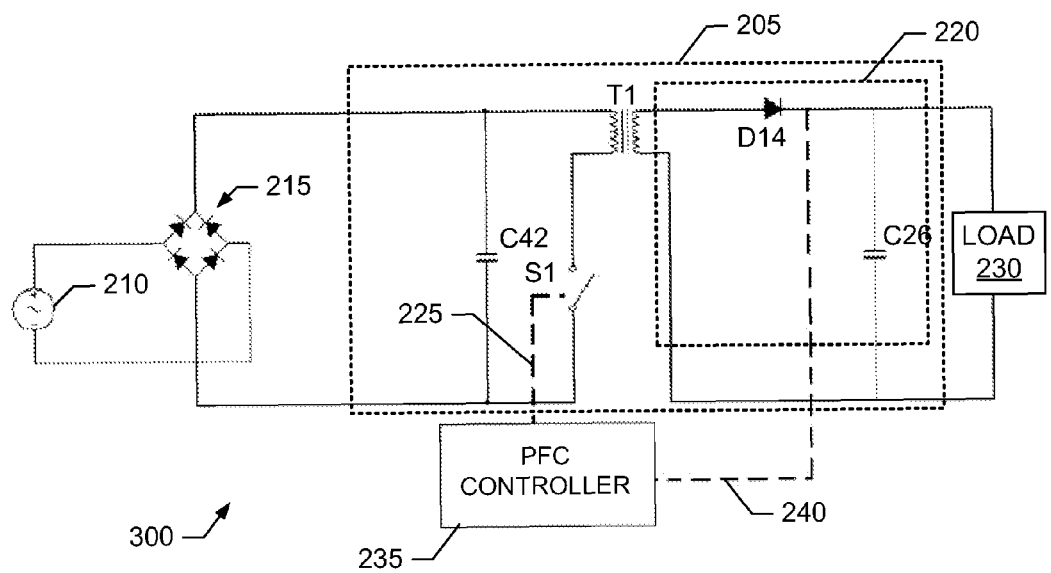
Figure 4:
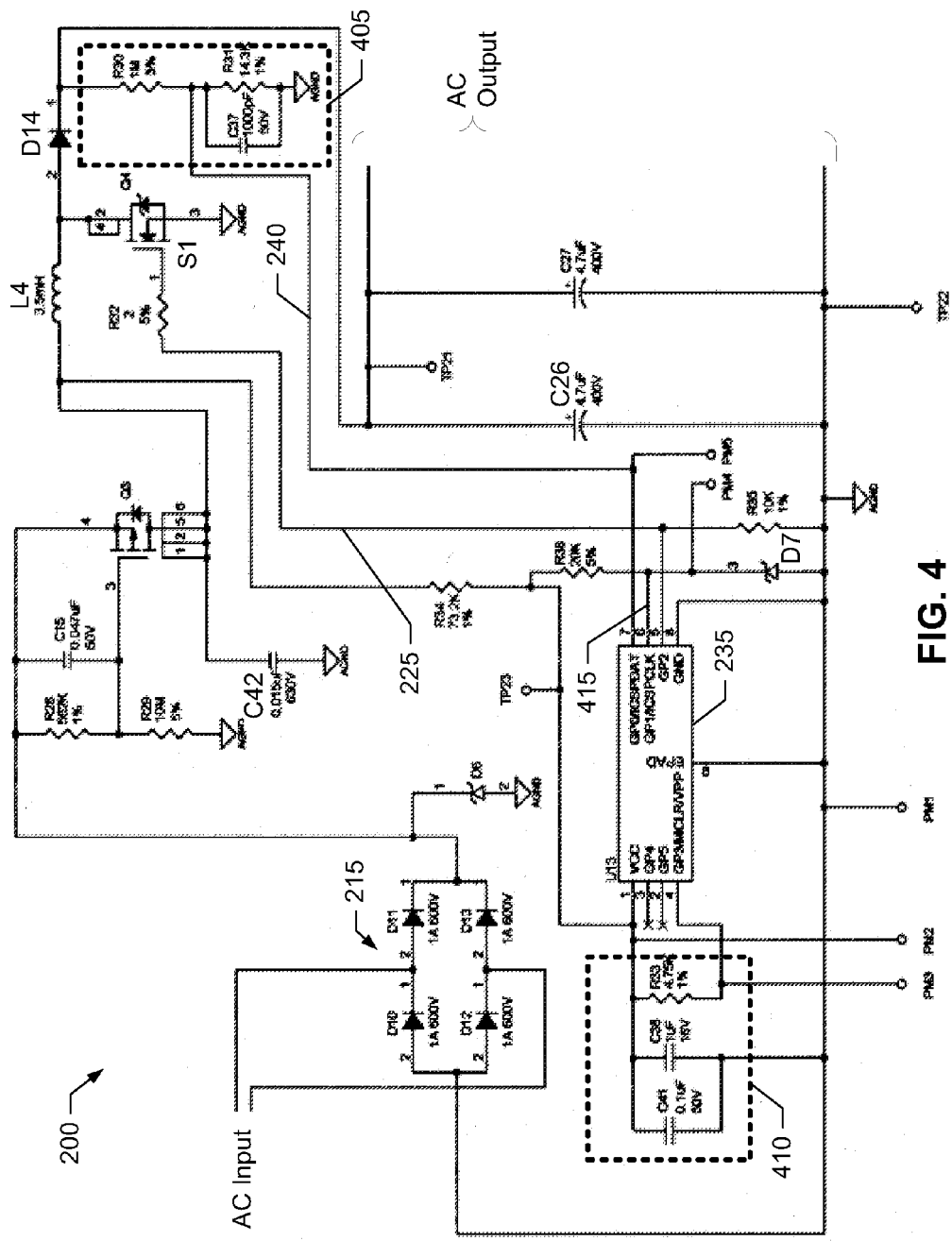

FIGS. 2 and 3 are schematics illustrating example manners of implementing the PFC circuit 125 of FIG. 1. FIG. 4 is a more detailed version of the schematic shown in FIG. 2. The example PFC circuit 200 of FIG. 2 includes a switching power converter 205. A voltage source 210 supplies an input voltage to a full, diode bridge rectifier 215. The voltage source 210 provides, for example, a 400 Hz AC line voltage in an aircraft. The rectifier 215 rectifies the input voltage and supplies a rectified, time-varying, input voltage to the switching power converter 205.

The switching power converter 205 includes an inductor L4 and a driver stage 220. The inductor L4 is controlled by a switch S1 to perform PFC. The driver stage 220 is also controlled by the switch S1 and regulates the transfer of energy from the voltage source 210 through the inductor L4 to a capacitor C26. Current in the inductor L4 ramps "up" (or increases) when the switch S1 conducts, i.e., is an "ON" state. The inductor current ramps "down" (or decreases) when the switch S1 is nonconductive, i.e., is in an "OFF" state, and supplies current to recharge the capacitor C26. The time period during which the inductor current ramps down is commonly referred to as the "inductor flyback time". A diode D14 prevents reverse current from flowing into the inductor L4. In at least one embodiment, the inductor L4 is selected so the switching power converter 205 operates in DCM. That is, the inductor L4 is selected so the inductor current ramp up time plus the inductor flyback time is less than the period of the switch S1. As such, the voltage across the inductor L4 is proportional to the input voltage. By operating in DCM, PFC control can be performed without need for current sensing, zero crossing detection or a coil, as required in conventional PFC circuits, thus, saving cost, board area, and complexity.

Input current is proportional to the on-time of the switch S1, and the energy transferred into the inductor L4 is proportional to the square of the on-time. The on-time of the switch S1 is determined by a control signal 225 provided by the PFC controller 235. In at least one embodiment, the control signal 225 is a pulse width modulated (PWM) signal, and the switch S1 is a metal-oxide semiconductor field-effect transistor (MOSFET), a bipolar transistor, an insulated gate bipolar transistor (IBGT), a silicon carbide (SiC) transistor, or the like that conducts when the control signal 225 is high (i.e., is a logical "one"). Accordingly, the energy transferred into the inductor L4 is proportional to the square of the pulse width of the control signal 225.

The capacitor C26 supplies stored energy to a load 230. The capacitor C26 is selected to be large enough to maintain a substantially constant output voltage, as established by a PFC controller 235. As shown in FIG. 4, more than one capacitor may be used to store and supply energy to the load 230. The output voltage of the switching power converter 205 remains substantially constant during constant load conditions. However, as load conditions change, the output voltage may change. The PFC controller 235 responds to such change(s) in output voltage and adjusts the control signal 225 to maintain a substantially constant output voltage. The PFC controller 235 may be implemented by one or more circuit(s), programmable processor(s), fuse(s), ASIC(s), PLD(s), FPLD(s), FPGA(s), etc. An example process that may be, for example, embodied as machine-readable instructions executed by the PFC controller 235 to control the PFC circuit 200 is described below in connection with FIG. 5.

The PFC controller 235 controls the switch S1, thereby controlling PFC and regulating output power of the switching power converter 205. The PFC controller 235 is configured to make the switching power converter 205 appear substantially resistive to the voltage source 210. Thus, the PFC controller 235 attempts to control energy transfer into the inductor current L4 so that the average inductor current is linearly and directly related to the input voltage. The PFC controller 235 supplies the PWM control signal 225 to control the conductivity of the switch S1. Parameters of the control signal 225 depend on a feedback signal 240 that represents the output voltage of the switching power converter 205. The output voltage may be sensed at a node between the diode D14 and the load 230. As shown in FIG. 4, the output voltage feedback signal 240 may be generated using a voltage divider 405.

The PFC controller 235 controls the pulse width and period of the control signal 225 based on the output voltage feedback signal 240. Thus, the PFC controller 235 controls the switching power converter 205 so that a desired amount of energy is transferred to the capacitor C26. The desired amount of energy depends upon the voltage and current requirements of the load 230. To regulate the amount of energy transferred and maintain power factor close to one, the PFC controller 235 varies the pulse width of the control signal 225 so that the input current tracks the input voltage while holding the output voltage substantially constant. Thus, as the input voltage increases, the PFC controller 235 increases the pulse width of the control signal 225, and as the input voltage decreases, the PFC controller 235 decreases the pulse width of the control signal 225. At the same time, the PFC controller 235 adjusts the period of the control signal 225 (i.e., time between pulses) to maintain a substantially constant duty cycle of the controls signal 225 and, thus, hold the output voltage substantially constant.

In some embodiments, the PFC controller 235 includes an internal 5 volt (V) shunt coupled to a supply voltage input VCC. In such embodiments, the AC input signal may be used to power the PFC controller 235 via a sub-circuit 410, as shown in FIG. 4. In the illustrated example of FIG. 4, the PFC controller 235 is the PIC12HV615 microcontroller manufactured by Microchip®, however, other controllers, microcontrollers and processors may be used to implement the PFC controller 235. In some embodiments, the PFC controller 235 implements a pulse-width modulator as a background task that controls the pulse width and period of the control signal 225. As described below in connection with FIG. 5, parameters of the pulse-width modulator may be adjusted by a foreground task in response to the output voltage feedback signal 240. In general, the adjustment of PWM parameters is performed at a lower frequency than the frequency of the AC input signal.

When the AC input voltage drops too low (e.g., during a brown out condition), the PFC controller 235 may not have a sufficient supply voltage (i.e., be close enough to 5V) to properly drive the switch S1. Accordingly, during such brown out conditions, the PFC controller 235 discontinues PFC control (i.e., leaves the switch S1 in the off or non-conductive state) until the brown out condition ends. To detect when the supply voltage drops too low, the AC input is fed into an analog-to-digital converter (ADC) input 415 of the PFC controller 235 via a capacitor R36 and a diode D7. The internal digital output corresponding to the ADC input 415 represents a ratio between the supply voltage of the PFC controller 235 and the Zener voltage of the diode D7. In the example of FIG. 4, the diode D7 is selected to have a Zener voltage of 4V, which corresponds to approximately a 70V AC input signal. Assuming a nominal 115V AC input signal, the internal digital output will have a value of approximately 820 assuming a 10-bit analog-to-digital converter. As the AC input voltage drops, the supply voltage of the PFC controller 235 drops closer to the 4V Zener voltage of the diode D7. Accordingly, as the AC input voltage drops, the internal digital output of the ADC input 415 increases toward its full-scale value of 1023, assuming a 10-bit ADC. When the digital output becomes too large (e.g., crosses a threshold), the PFC controller 235 discontinues PFC control until the digital output drops below the threshold. An example threshold is 1023 (assuming a 10-bit ADC), which represents that the supply voltage VCC of the PFC controller 235 has dropped to approximately the Zener voltage of the diode D7.

In circumstances where a slightly low output voltage is acceptable, the PFC controller 235 may use hysteresis to control the PFC circuit 200. In particular, whenever the output voltage is within an acceptable range of the target output voltage, the PFC controller 235 need not change PWM parameters. The use of hysteresis guarantees loop stability, substantially eliminates output voltage overshoot, and substantially eliminates oscillations. Additionally or alternatively, the PFC controller 235 can increase the output voltage at a slower rate than it decreases the output voltage. Moreover, when the PFC circuit 200 is first powered on, the PFC controller 235 may slowly increase the output voltage to control or limit inrush current.

The example PFC controller 235 can be configured to handle AC input signals of different frequencies (e.g., 60 Hz, 400 HZ, etc.) by adjusting, for example, the polling rate of the output voltage feedback signal 240 and/or the rate at which PWM parameters are adjusted. In some examples, the PFC controller 235 dithers the switching frequency to reduce EMI emissions. For example, the PFC controller 235 can periodically (e.g., every 50 or 100 milliseconds) (pseudo-)randomly adjust the switching frequency by a small amount to spread EMI emissions over a range of frequencies. By spreading EMI emissions over a range of frequencies in a spread spectrum fashion, any EMI emissions can be made less problematic for other nearby devices.

FIG. 3 is a schematic illustrating another manner of implementing the example PFC circuit 125 of FIG. 1. The schematic of FIG. 3 is similar to the schematic of FIG. 2 and, thus, the descriptions of identical elements are not repeated here. Instead, the interested reader is referred to the descriptions provided above in connection with FIGS. 2 and 4.

In FIG. 3, PFC control and voltage conversion is performed together via a transformer T1. Accordingly, the switch S1 is connected to the primary side of the transformer T1 and the output voltage feedback signal 240 is connected to the secondary side of the transformer T1. In the example of FIG. 3, the voltage conversion can realize a voltage source with voltage feedback, or a current source with current feedback. Regardless of whether PFC is performed as a front-end to voltage conversion, as shown in FIGS. 2 and 4, or together with voltage conversion, as shown in FIG. 3, the same PFC control functions can be implemented by the PFC controller 234.

While example PFC circuits 200 and 300 are illustrated in FIGS. 2-4, any of the illustrated elements and devices may be combined, divided, re-arranged, omitted, eliminated and/or implemented in any other way. Moreover, the PFC circuits 200 and 300 may include elements or devices instead of, or in addition to, those illustrated, and/or may include more than one of any or all of the illustrated elements and devices.

FIG. 6 is a flowchart of an example process that may, for example, be implemented as instructions carried out by one or more processors to implement the PFC controller 235 disclosed herein. The example process of FIG. 6 may be embodied in program code and/or computer-readable instructions stored on a tangible or non-transitory machine-readable medium accessible by a processor, a computer and/or other machine having a processor. Computer-readable instructions comprise, for example, instructions that cause a processor, a computer and/or a machine having a processor to perform one or more particular processes. Alternatively, some or all of the example process may be implemented using any combination of fuses, ASICs, PLDs, FPLDs, FPGAs, discrete logic, hardware, and firmware.

Figure 5:
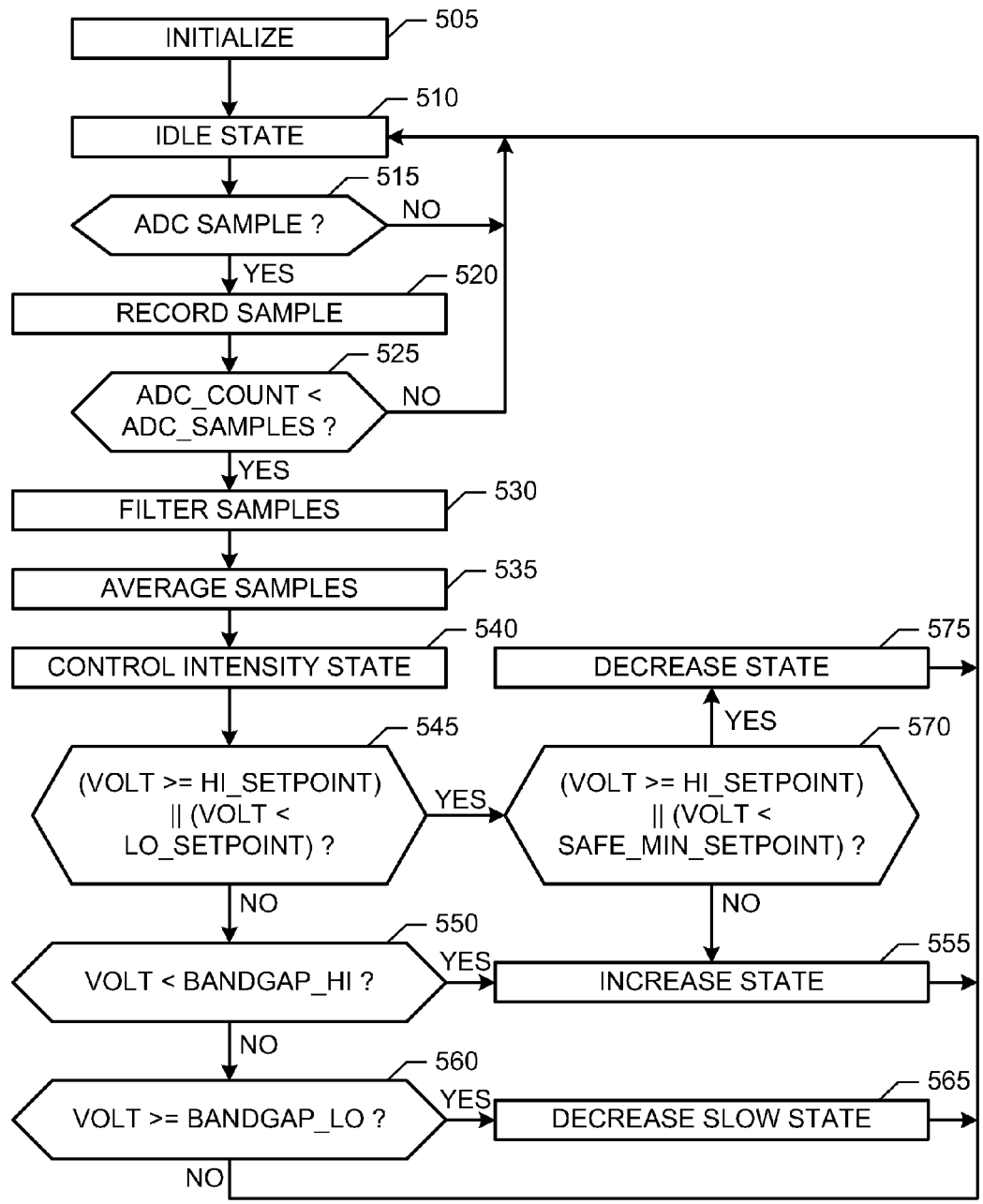
FIG. 5 is a flowchart illustrating an example process that may, for example, be embodied as machine-readable instructions executed by a processor to control the example PFC circuits of FIGS. 2-4.

The example process of FIG. 5 begins with the PFC controller 235 setting initial PWM parameters (block 505). The example process enters an idle state (block 510).

As samples of the output voltage feedback signal 240 are generated by, for example, an ADC converter in the PFC controller 235 (block 515), the samples are recorded in a buffer (block 520).

When a sufficient number of samples have been collected (block 525), the PFC controller 235 applies one or more filters to the samples to, for example, remove the effects of noise and/or remove outlying values (block 530). The PFC controller 235 computes an average of the filtered samples (block 535).

Based on the average output voltage, the PFC controller 235 determines whether the output voltage needs to be increased or decreased (block 540). If the average output voltage is between HI_SETPOINT and LO_SETPOINT (block 545) and is less greater than BANDGAP_HI (block 550), the PFC controller 235 changes the PWM parameters to increase the output voltage (block 555), and control returns to block 510 to wait for another block of samples to be recorded. The value of BANDGAP_HI represents a voltage below a target output voltage that is acceptable. The values of HI_SETPOINT and LO_SETPOINT represent a target output voltage range.

Returning to block 550, if the average output voltage is greater than BANDGAP_HI (block 550) and greater than or equal to BANDGAP_LO (block 560), the PFC controller 235 changes the PWM parameters to decrease the output voltage at a slow rate (block 565), and control returns to block 510 to wait for another block of samples to be recorded.

Returning to block 545, if the average output voltage is greater than or equal to HI_SETPOINT or less than LO_S-ETPOINT (block 545), and the average output voltage is greater than or equal to HI_SETPOINT or less than SAFE_MIN_SETPOINT (block 570), the PFC controller 235 changes the PWM parameters to decrease the output voltage (block 575), and control returns to block 510 to wait for another block of samples to be recorded. The value of SAFE_MIN_SETPOINT represents an under-voltage input condition.

If the average output voltage is less than HI_SETPOINT and greater than or equal to SAFE_MIN_SETPOINT (block 570), the PFC controller 235 changes the PWM parameters to increase the output voltage (block 555), and control returns to block 510 to wait for another block of samples to be recorded. Returning to block 545, The embodiments disclosed herein may include a memory for storing program data, a processor for executing the program data to implement the methods and apparatus disclosed herein, a permanent storage such as a disk drive, a communication port for handling communication with other devices, and user interface devices such as a display, a keyboard, a mouse, etc. When software modules are involved, these software modules may be stored as program instructions or computer-readable codes, which are executable by the processor, on a non-transitory or tangible computer-readable media such as a read-only memory (ROM), a random-access memory (RAM), a compact disc (CD), a digital versatile disc (DVD), a magnetic tape, a floppy disk, an optical data storage device, an electronic storage media (e.g., an integrated circuit (IC), an electronically erasable programmable read-only memory (EEPROM), a flash memory, etc.), a quantum storage device, a cache, and/or any other storage media in which information may be stored for any duration (e.g., for extended time periods, permanently, for brief instances, for temporary buffering, for caching, etc.). As used herein, a computer-readable storage medium expressly excludes any computer-readable media on which signals may be propagated. However, a computer-readable storage medium may include internal signal traces and/or internal signal paths carrying electrical signals thereon.

Any references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of this disclosure, reference has been made to the embodiments illustrated in the drawings, and specific language has been used to describe these embodiments. However, no limitation of the scope of this disclosure is intended by this specific language, and this disclosure should be construed to encompass all embodiments that would normally occur to one of ordinary skill in the art in view of this disclosure.

Disclosed embodiments may be described in terms of functional block components and various processing steps. Such functional blocks may be realized by any number of hardware and/or software components configured to perform the specified functions. For example, the embodiments may employ various integrated circuit components (e.g., memory elements, processing elements, logic elements, look-up tables, and the like) that may carry out a variety of functions under the control of one or more processors or other control devices. Similarly, where the elements of the embodiments are implemented using software programming or software elements, the embodiments may be implemented with any programming or scripting language such as C, C++, Java, assembler, or the like, using any combination of data structures, objects, processes, routines, and other programming elements. Functional aspects may be implemented as instructions executed by one or more processors. Furthermore, the embodiments could employ any number of conventional techniques for electronics configuration, signal processing, control, data processing, and the like. The words "mechanism" and "element" are used broadly and are not limited to mechanical or physical embodiments, but can include software routines in conjunction with processors, etc.

The particular implementations shown and described herein are illustrative examples and are not intended to otherwise limit the scope of this disclosure in any way. For the sake of brevity, conventional electronics, control systems, software development, and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the embodiments unless the element is specifically described as "essential" or "critical".

The use of the terms "a," "an," "the," and similar referents in the context of describing the embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. The steps of all methods described herein can be performed in any suitable order unless otherwise indicated herein or otherwise clearly contradicted by context. Moreover, one or more of the blocks and/or interactions described may be changed, eliminated, sub-divided, or combined; and disclosed processes may be carried out sequentially and/or carried out in parallel by, for example, separate processing threads, processors, devices, discrete logic, circuits, etc. The examples provided herein and the exemplary language (e.g., "such as" or "for example") used herein are intended merely to better illuminate the embodiments and does not pose a limitation on the scope of this disclosure unless otherwise claimed. In view of this disclosure, numerous modifications and adaptations will be readily apparent to those skilled in this art without departing from the spirit and scope of this disclosure.

While particular digitally-controlled PFC circuits, methods, and articles of manufacture have been particularly shown and described with reference to exemplary embodiments thereof, it will be understood by those of ordinary skill in the art that various changes in form and details may be made therein without departing from the spirit and scope of this disclosure.

What is claimed is:

1. A power supply comprising a power factor correction circuit comprising:
a switching power converter comprising
a switch, and
an inductor having a first terminal connected to an input voltage, and a second terminal connected to the switch, a storage capacitor and a load, a value of the inductor selected to operate the power factor correction circuit in discontinuous conduction mode (DCM);
a programmable controller programmed to operate the switch to increase a power factor of the power supply; and a diode connecting the inductor to the load and the storage capacitor;

wherein:

the programmable controller is programmed to periodically adjust a switching frequency of the switch while operating within a DCM to reduce electromagnetic interference;

the programmable controller is programmed to operate the switch without sensing a voltage at the input of the switching power converter;

the programmable controller varies during operation a rate of increase or decrease of an output voltage of the switching power converter by varying parameters of the programmable controller based on a voltage sensed between the diode and the load; and the programmable controller is programmed to increase the output voltage of the switching power converter at a slower rate than the output voltage is decreased.

2. The power supply of claim 1, wherein the programmable controller is programmed to operate the switch to spread electromagnetic interference across a range of frequencies.

3. The power supply of claim 1, wherein the programmable controller is selectively configurable to operate the power supply at two or more switching frequencies.

4. The power supply of claim 1, wherein the controller is programmed to not change the operation of the switch to reduce at least one of an oscillation, an instability, or an electromagnetic interference.

5. The power supply of claim 1, wherein the programmable controller is programmed to adjust a pulse width associated with an operation of the switch based on the output voltage of the switching power converter.

6. The power supply of claim 1, wherein the programmable controller is programmed to discontinue operation of the switch when a supply voltage drops below a threshold.

7. A method, carried out by a programmable controller, of controlling a switch of a power factor correction circuit, the power factor correction circuit comprising a switching power converter that includes an inductor having a first terminal connected to an input voltage and a second terminal connected to the switch, a load, a storage capacitor, and a diode connecting the inductor to the load and the storage capacitor, the method comprising:

operating the switch to increase a power factor of a power supply;

adjusting a pulse width associated with an operation of the switch based on an output voltage of the switching power converter;

deviating a switching frequency of the switch from a nominal switching frequency while operating within a discontinuous conduction mode (DCM) to reduce electromagnetic interference;

sensing a voltage between the diode and the load;

varying, during operation, a rate of increase or decrease of the output voltage of the switching power converter by varying parameters of the programmable controller based on the voltage sensed between the diode and the load and without sensing a voltage at the input of the switching power converter; and increasing the output voltage of the switching power converter at a slower rate than the output voltage is decreased.

8. The method of claim 7, further comprising periodically deviating the switching frequency by a pseudo-random amount.

9. The method of claim 7, further comprising adjusting the nominal switching frequency to substantially correspond to an input voltage frequency.

10. The method of claim 7, further comprising not adjusting the operation of the switch to reduce at least one of an oscillation, an instability, or an electromagnetic interference.

11. The method of claim 7, further comprising discontinuing the operation of the switch when an inadequate supply voltage condition is detected.

12. A non-transitory, computer-readable medium having stored thereon computer-executable instructions for carrying out the method of claim 7.

13. The method of claim 7, wherein a small difference between output voltage and a target output voltage triggers a change in the parameters of the programmable controller only if a hysteresis threshold is exceeded.

14. The method of claim 7, wherein, when the programmable controller is first powered on, it slowly increases the output voltage to control or limit inrush current.

15. A power supply comprising:

a power source; and a power factor correction circuit including:

a switching power converter including a switch, and a transformer having a first side connected to the power source and the switch, and a second side connected to a storage capacitor and a load; and a diode connecting the inductor to the load and the storage capacitor;

a programmable controller that is programmed to:

operate the switch to control a power factor of the power supply, periodically adjust a switching frequency of the switch while operating within a discontinuous conduction mode (DCM) to reduce electromagnetic interference, operate the switch without sensing a voltage at the input of the switching power converter, vary, during operation, a rate of increase or decrease of an output voltage of the switching power converter by varying controller parameters based on a voltage sensed between the diode and the load, and increase the output voltage of the switching power converter at a slower rate than the output voltage is decreased.

* * * * *